(12) United States Patent
Hong et al.

(10) Patent No.: US 11,838,196 B2
(45) Date of Patent: Dec. 5, 2023

(54) NETWORK FORENSIC SYSTEM AND METHOD

(71) Applicant: Quad Miners, Seoul (KR)

(72) Inventors: Jae Wan Hong, Seoul (KR); Young Jin Park, Seoul (KR)

(73) Assignee: Quad Miners, Seoul (KR)

( * ) Notice: Subject to any disclaimer, the term of this patent is extended or adjusted under 35 U.S.C. 154(b) by 48 days.

(21) Appl. No.: 15/930,177

(22) Filed: May 12, 2020

(65) Prior Publication Data

US 2020/0412634 A1    Dec. 31, 2020

Related U.S. Application Data

(63) Continuation of application No. PCT/KR2019/008860, filed on Jul. 18, 2019.

(30) Foreign Application Priority Data

Jun. 20, 2019  (KR) .......................... 10-2019-0073260
Jun. 20, 2019  (KR) .......................... 10-2019-0073261
Jun. 20, 2019  (KR) .......................... 10-2019-0073262

(51) Int. Cl.
*H04L 43/16*        (2022.01)
*H04L 43/0876*    (2022.01)
*H04L 69/22*        (2022.01)
*H04L 43/06*        (2022.01)
*H04L 67/1097*    (2022.01)
*H04L 43/0817*    (2022.01)

(Continued)

(52) U.S. Cl.
CPC .......... *H04L 43/16* (2013.01); *G06F 12/0866* (2013.01); *H04L 43/04* (2013.01); *H04L 43/06* (2013.01); *H04L 43/0817* (2013.01); *H04L 43/0876* (2013.01); *H04L 49/9042* (2013.01); *H04L 63/12* (2013.01); *H04L 63/1416* (2013.01); *H04L 63/1466* (2013.01); *H04L 67/1097* (2013.01); *H04L 69/22* (2013.01)

(58) Field of Classification Search
CPC ... G06F 12/0866; H04L 43/028; H04L 43/04; H04L 43/06; H04L 43/0817; H04L 43/0876; H04L 43/16; H04L 49/9042; H04L 63/1425; H04L 67/1097; H04L 69/22

See application file for complete search history.

(56) References Cited

U.S. PATENT DOCUMENTS 5,584,008 A  *  12/1996  Shimada ............... G06F 3/0601
                                                                            711/112
9,218,689 B1 *  12/2015  Baldwin ............... G06T 15/005
(Continued)

FOREIGN PATENT DOCUMENTS

KR    10-2010-0016330    8/2011
KR    10-2014-0074301    6/2016
(Continued)

*Primary Examiner* — Omer S Mian
(74) *Attorney, Agent, or Firm* — AVEK IP, LLC

(57) ABSTRACT

A high performance packet stream storage method. Original packet data from data traffic transmitted over a network is collected. Collected original packet data is written in a memory. Metadata from the collected original package data is extracted and metadata is written in the memory. The original packet data and the metadata is stored in a storage unit.

11 Claims, 11 Drawing Sheets

(51) Int. Cl.
  *G06F 12/0866* (2016.01)
  *H04L 49/90* (2022.01)
  *H04L 9/40* (2022.01)
  *H04L 43/04* (2022.01)

(56) References Cited

U.S. PATENT DOCUMENTS

| | | | | |
|---|---|---|---|---|
| 9,229,657 | B1* | 1/2016 | Rus | G06F 3/0631 |
| 9,961,095 | B2* | 5/2018 | Savchuk | H04L 43/026 |
| 10,051,142 | B1* | 8/2018 | Villena | H04N 1/2166 |
| 10,075,455 | B2* | 9/2018 | Zafar | G06F 21/552 |
| 10,291,632 | B2 | 5/2019 | Zheng et al. | |
| 10,437,572 | B1* | 10/2019 | Ghaleb | G06F 8/37 |
| 10,659,478 | B2* | 5/2020 | Heilig | H04L 63/1408 |
| 11,196,555 | B1* | 12/2021 | Mouraveiko | H04L 69/22 |
| 2005/0089033 | A1* | 4/2005 | Gupta | H04L 49/9094 370/389 |
| 2008/0104339 | A1* | 5/2008 | Nakagawa | G06F 3/0634 711/154 |
| 2009/0238088 | A1* | 9/2009 | Tan | H04L 41/142 370/252 |
| 2015/0264072 | A1* | 9/2015 | Savchuk | H04L 63/0227 726/23 |
| 2016/0078229 | A1* | 3/2016 | Gong | H04L 63/1416 726/24 |
| 2016/0156531 | A1* | 6/2016 | Cartwright | H04M 3/42059 455/423 |
| 2016/0378344 | A1* | 12/2016 | Nachimuthu | G06F 11/1441 711/103 |
| 2017/0005952 | A1* | 1/2017 | Lee | H04L 49/901 |
| 2017/0329797 | A1* | 11/2017 | Choi | G06F 16/13 |
| 2018/0004942 | A1* | 1/2018 | Martin | H04L 63/1425 |
| 2021/0329589 | A1* | 10/2021 | Touboul | H04W 28/06 |

FOREIGN PATENT DOCUMENTS

| | | |
|---|---|---|
| KR | 10-2015-0002787 | 11/2016 |
| KR | 10-2015-0093992 | 12/2016 |

* cited by examiner

NETWORK FORENSIC SYSTEM AND METHOD

CROSS REFERENCE TO RELATED APPLICATIONS

The application is a continuation of International Patent Application, Serial No. PCT/KR2019/008860 filed on Jul. 18, 2019, which claims priority to Korean Patent Applications, Serial Nos. 10-2019-0073260, 10-2019-0073261 and 10-2019-0073262, filed Jun. 20, 2019. The disclosure of each is incorporated by reference herein in its entirety.

TECHNICAL FIELD

The present disclosure relates to a network forensic system and a network forensic method using the same and, more particularly, to a high performance packet stream storage system and method, a pattern-based index processing system and method, and a scenario-based real-time attack detection system and method, which are implemented by a network forensic system and method.

BACKGROUND ART

In the era in which all things, such as houses, vehicles, cities and factories, in addition to information technology (IT) devices are connected over ultra-high speed networks, when hacking or cyber terrorism occurs, the impact of the hacking or cyber terrorism is considerable. Accordingly, many companies make efforts to reinforce network security.

However, hacking attack is diversified as days go by, and a level of difficulty of attack perception is gradually increasing. Accordingly, there is a need for a technology capable of understanding a general flow of a hacking attack and rapidly perceiving the attack of a hacker through rapid packet analysis.

99% hacking attempts result in an invasion accident within several days. Among them, 85% cause data leakage, and several weeks or more are taken to discover 85% of hacking accidents.

Accordingly, a lot of research has been carried out to reduce the attack perception time of a hacker through rapid packet analysis.

Furthermore, in order to store and analyze a large amount of ultra-high speed traffic, fast I/O performance is necessary. To this end, if a high-speed storage is used, there is a problem in that a product cost rises. Accordingly, there is a need for a technology capable of collecting and storing packets without a loss of data in a large amount of ultra-high speed traffic even without using a high-speed storage and analyzing data for countering various attack scenarios and environments.

SUMMARY

An object of a high performance packet stream storage system and high performance packet stream storage method implemented by a network forensic system and method according to the technical spirit of the present disclosure may be to provide a high performance packet stream storage system having a high-speed data storage technology for performing fast analysis and actions on a hacking accident based on a large amount of ultra-high speed data and a high performance packet stream storage method using the same.

An object of a pattern-based index processing system and pattern-based index processing method implemented by a network forensic system and method according to the technical spirit of the present disclosure may be to provide a pattern-based index processing system and pattern-based index processing method capable of processing an index in real time.

An object of a pattern-based index processing system and pattern-based index processing method implemented by a network forensic system and method according to the technical spirit of the present disclosure may be to provide a pattern-based index processing system and pattern-based index processing method capable of generating user-defined index data in order to counter various attack scenarios and environments.

An object of a pattern-based index processing system and pattern-based index processing method implemented by a network forensic system and method according to the technical spirit of the present disclosure may be provide a pattern-based index processing system and pattern-based index processing method, which enable a user to designate data at problematic timing and to index the data again.

An object of a pattern-based index processing system and pattern-based index processing method implemented by a network forensic system and method according to the technical spirit of the present disclosure may be to provide a pattern-based index processing system and pattern-based index processing method capable of classifying applications, metadata or user-defined patterns for scenario analysis.

An object of a scenario-based real-time attack detection system and scenario-based real-time attack detection method implemented by a network forensic system and method according to the technical spirit of the present disclosure may be to provide a scenario-based real-time attack detection system and scenario-based real-time attack detection method capable of classifying data for each hacking scenario through an index integration process and rapidly analyzing a hacking accident.

An object of a scenario-based real-time attack detection system and scenario-based real-time attack detection method implemented by a network forensic system and method according to the technical spirit of the present disclosure may be to provide a scenario-based real-time attack detection system and scenario-based real-time attack detection method capable of classifying applications, metadata or user-defined patterns for scenario analysis.

Technical objects to be achieved by the network forensic system and the network forensic method using the same according to the technical spirit of the present disclosure are not limited to the aforementioned technical objects, and other technical objects not described above may be evidently understood by those skilled in the art from the following description.

A high performance packet stream storage method by a high performance packet stream storage system according to an embodiment based on the technical spirit of the present disclosure may include the steps of (a) collecting original packet data from data traffic transmitted over a network, (b) writing the collected original packet data in a memory, (c) extracting metadata from the collected original packet data and writing the metadata in the memory, and (d) storing, in a storage unit, the original packet data and the metadata from the memory.

The high performance packet stream storage method may further include the step of excluding exception information from a memory writing target by filtering out the exception information from the collected original packet data.

The storage unit includes a local disk. The step (d) may include the step of directly storing, in the local disk, the original packet data and the metadata from the memory when a network speed is a given reference or less.

The storage unit includes a plurality of extension nodes. The step (d) may include the step of distributing and storing, in the plurality of extension nodes, the original packet data and the metadata from the memory when a network speed exceeds a given reference.

The high performance packet stream storage method may further include the step of returning the memory in which the original packet data and the metadata have been written after the step (d).

The step (a) may include the step of securing an additional memory for an exceeded amount of original packet data when the amount of collected packets exceeds a collection setting value.

The step (c) may include the step of storing, in the storage unit, the collected original packet data and the extracted metadata from the memory after the collected original packet data and the extracted metadata are written in the memory for a given writing period.

A high performance packet stream storage system according to an embodiment based on the technical spirit of the present disclosure may include a data access module collecting original packet data from data traffic transmitted over a network and extracting metadata from the collected original packet data, a memory unit in which the original packet data and the metadata are written, a storage unit in which the original packet data and the metadata are stored and data-based, a storage management module storing, in the storage unit, the original packet data and the metadata from the memory unit, and a data memory module returning a memory region of the memory unit in which the original packet data and the metadata had been written after the original packet data and the metadata from the memory unit were stored in the storage unit.

The storage unit includes a local disk. The storage management module may include a disk interface module. When a network speed is a given reference or less, the disk interface module may directly store, in the local disk, the original packet data and the metadata from the memory unit.

The storage unit includes a plurality of extension nodes. The storage management module may include a data distributed module. When a network speed exceeds a given reference, the data distributed module may distribute and store, in the extension nodes, the original packet data and the metadata from the memory unit.

A pattern-based index processing method using a pattern-based index processing system according to an embodiment based on the technical spirit of the present disclosure may include the steps of (a) recombining original packet data, (b) performing application analysis on the reassembled original packet data, and (c) extracting and indexing metadata of the reassembled original packet data.

The step (a) may include the step of recombining the original packet data based on TCP header information.

The step (b) may include the step of determining an application for the reassembled original packet data based on an RFC standard.

When the reassembled original packet data is data generated by an application of the RFC standard, the step (c) may include the step of extracting the metadata of the reassembled original packet data based on the RFC standard.

The step (b) may include the step of determining an application for the reassembled original packet data based on a user-defined standard.

When the reassembled original packet data is data generated by an application of the user-defined standard, the step (c) may include the step of extracting metadata from the analyzed original packet data based on the user-defined standard.

In the pattern-based index processing method, the step (a) may include the steps of collecting the original packet data from data traffic transmitted over a network, writing the collected original packet data in a memory for a given writing period time, extracting metadata from the collected original packet data and writing the metadata in the memory for the given writing period time, storing, in a storage unit, the written original packet data and metadata from the memory when the given writing period elapses, and recombining the original packet data stored in the given writing period unit.

The step (a) may include the step of returning the memory in which the original packet data and the metadata have been written after the step of storing the written original packet data and metadata in the storage unit.

The storage unit includes a local disk. The step (a) may include the step of directly storing, in the local disk, the original packet data and the metadata from the memory when a network speed is a given reference or less.

The storage unit includes a plurality of extension nodes. The step (a) may include the step of distributing and storing, in the plurality of extension nodes, the original packet data and the metadata from the memory when a network speed exceeds a given reference.

A scenario-based real-time attack detection method using a scenario-based real-time attack detection system according to an embodiment based on the technical spirit of the present disclosure may include the steps of (a) forming a scenario to be applied to indexed metadata, (b) extracting metadata from packet data and indexing the metadata, and (c) detecting indexed metadata corresponding to the scenario.

The step (a) may include the steps of forming a single detection scenario to be applied to the indexed metadata and forming a multi-detection scenario in which the single detection scenarios have been combined.

The single detection scenario may include one or more establishment conditions. The single detection scenario may be determined to have been established when all the establishment conditions are satisfied. The establishment condition may include an index type and pattern information.

The multi-detection scenario may be determined to have been established when all of two or more single detection scenarios are established and a common condition is established.

The step (b) may include the steps of recombining packet data stored in a given writing period unit based on TCP header information and extracting metadata from the reassembled packet data and indexing the metadata.

The step (b) may include the steps of collecting the packet data from data traffic transmitted over a network prior to the step of recombining the packet data, recording, in a memory, the collected packet data for a given writing period time, extracting metadata from the collected packet data and writing the metadata in the memory for the given writing period time, and storing, in a storage unit, the written packet data and metadata from the memory when the given writing period elapses.

The step (b) may include the step of returning the memory in which the packet data and the metadata have been written after the step of storing the written packet data and metadata in the storage unit.

The storage unit includes a local disk. The step (b) may include the step of directly storing, in the local disk, the packet data and the metadata from the memory when a network speed is a given reference or less.

The storage unit includes a plurality of extension nodes. The step (b) may include the step of distributing and storing, in the plurality of extension nodes, the packet data and the metadata from the memory when a network speed exceeds a given reference.

The scenario-based real-time attack detection method may further include the step of performing application analysis on the packet data prior to the step (b).

The high performance packet stream storage system and high performance packet stream storage method implemented by the network forensic system and method according to embodiments based on the technical spirit of the present disclosure may have the following effects.

(1) A partition key-based sequential storage database can be provided as a high performance packet stream storage technology for performing fast analysis and actions on a hacking accident.

(2) A technology for storing a packet stream without a loss of data in an ultra-high speed network, extracting summarized data thereof, and databasing the data can be provided.

(3) A technology for distributing, storing, and processing packets so that a large amount of ultra-high speed traffic can be stored even without using a high-speed storage can be provided.

The pattern-based index processing system and pattern-based index processing method implemented by the network forensic system and method according to embodiments based on the technical spirit of the present disclosure may have the following effects.

(1) A pattern-based index processing technology capable of processing an index in real time can be provided.

(2) A technology capable of generating user-defined index data in order to counter various attack scenarios and environments can be provided.

(3) A technology for enabling a user to designate data at problematic timing and to index the data again can be provided.

(4) A technology capable of classifying applications, metadata or user-defined patterns for scenario analysis can be provided.

The scenario-based real-time attack detection system and scenario-based real-time attack detection method implemented by the network forensic system and method according to embodiments based on the technical spirit of the present disclosure may have the following effects.

(1) A scenario-based real-time attack detection technology capable of classifying data for each hacking scenario through an index integration process and rapidly analyzing a hacking accident can be provided.

(2) A scenario-based real-time attack detection technology capable of classifying applications, metadata or user-defined patterns for scenario analysis can be provided.

However, effects which may be achieved by the high performance packet stream storage system and high performance packet stream storage method according to an embodiment of the present disclosure are not limited to the aforementioned effects, and other effects not described above may be evidently understood by those skilled in the art from the following description.

BRIEF DESCRIPTION OF THE SEVERAL VIEWS OF THE DRAWINGS

A brief description of each of drawings cited in this specification is provided for more sufficient understanding of the drawings.

DETAILED DESCRIPTION

Figure 1:
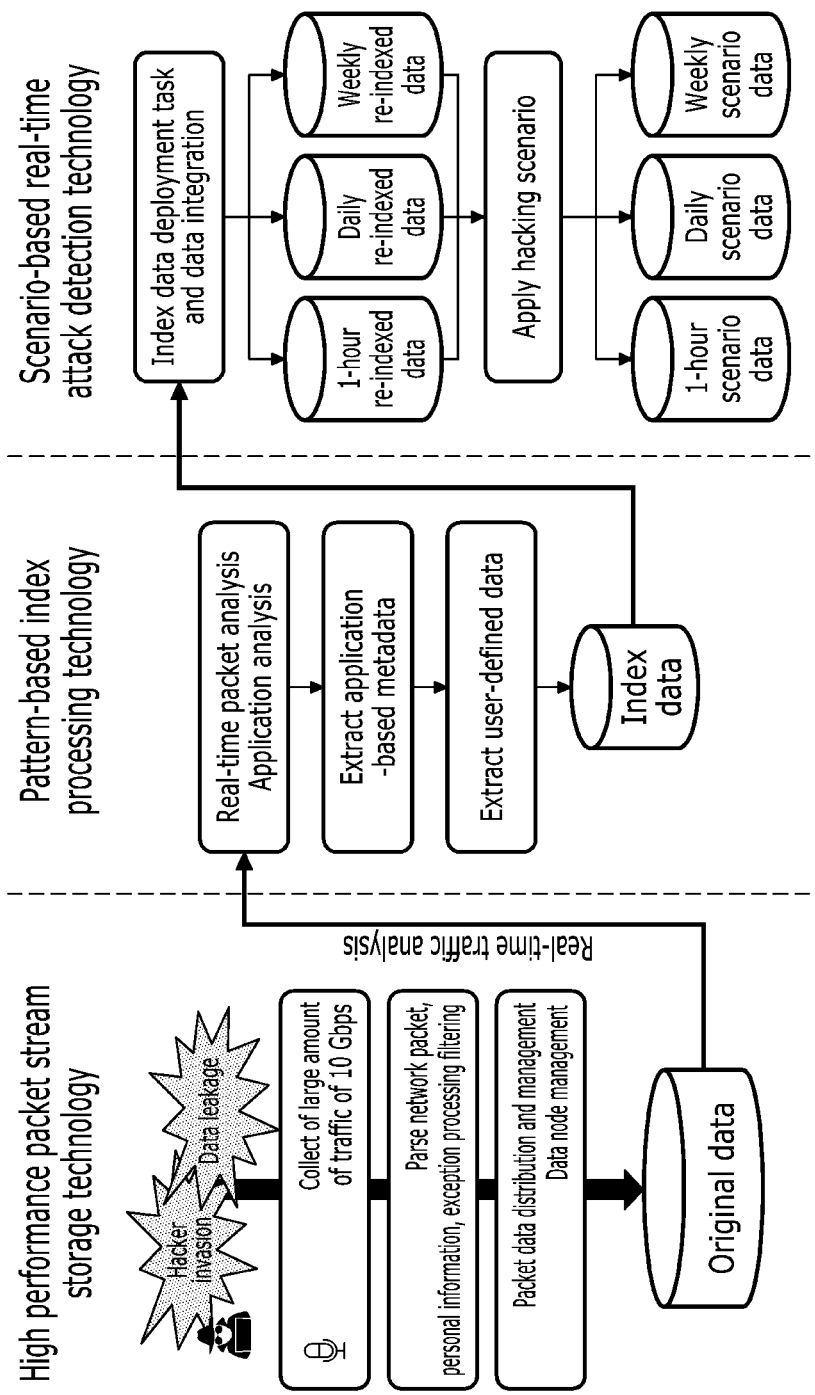
FIG. 1 is a schematic flowchart of a method of perceiving a hacking attack and improving cause analysis performance by a network forensic system and method according to an embodiment of the present disclosure.

The present disclosure may be changed in various ways and may have various embodiments, and specific embodiments are illustrated in the drawings and described in detail through a detailed description. It is however to be understood that the present disclosure is not intended to be limited to the specific present disclosure and that the present disclosure includes all changes, equivalents and substitutions which fall within the spirit and technological scope of the present disclosure.

In describing the present disclosure, a detailed description of related known functions or elements will be omitted if it is deemed to make the gist of the present disclosure unnecessarily vague. A number (e.g., the first or the second) used in the description process of this specification is merely an identification symbol for distinguishing one element from the other element.

Furthermore, in this specification, when it is described that one element is "connected" or "coupled" to the other element, the one element may be directly connected or directly coupled to the other element, but should be understood that the one element may be connected or coupled to the other element through yet another element unless specially described otherwise.

Furthermore, in this specification, two or more elements expressed as "~unit" may be merged into a single element or one element may be divided into two or more elements for each subdivided function. Furthermore, each of the elements to be described hereinafter may additionally perform some of or all the functions of another element in addition to a main function performed by each element. Some of the main function of each element may be fully covered and performed by another element.

Hereinafter, embodiments according to the technical spirit of the present disclosure are sequentially described in detail.

FIG. 1 is a schematic flowchart of a method of perceiving a hacking attack and improving cause analysis performance by a network forensic system and method according to an embodiment of the present disclosure.

As a hacking attack method is diversified and complicated, a lot of time and costs are taken for packet analysis and perception. Solutions for three problems are necessary to solve such hacking.

First, a degree of the difficulty of packet analysis is increased according to an increase in the complexity of an attack. Second, a large amount of general packets from a previous behavior for an attack, and not only an event log when an accident occurs, needs to be analyzed. Third, it is difficult to collect and analyze an ultra-high speed network.

To this end, a high performance packet stream storage technology, a pattern-based index processing technology and a scenario-based real-time attack detection technology, such as those illustrated in FIG. 1, have been developed.

Figure 2:
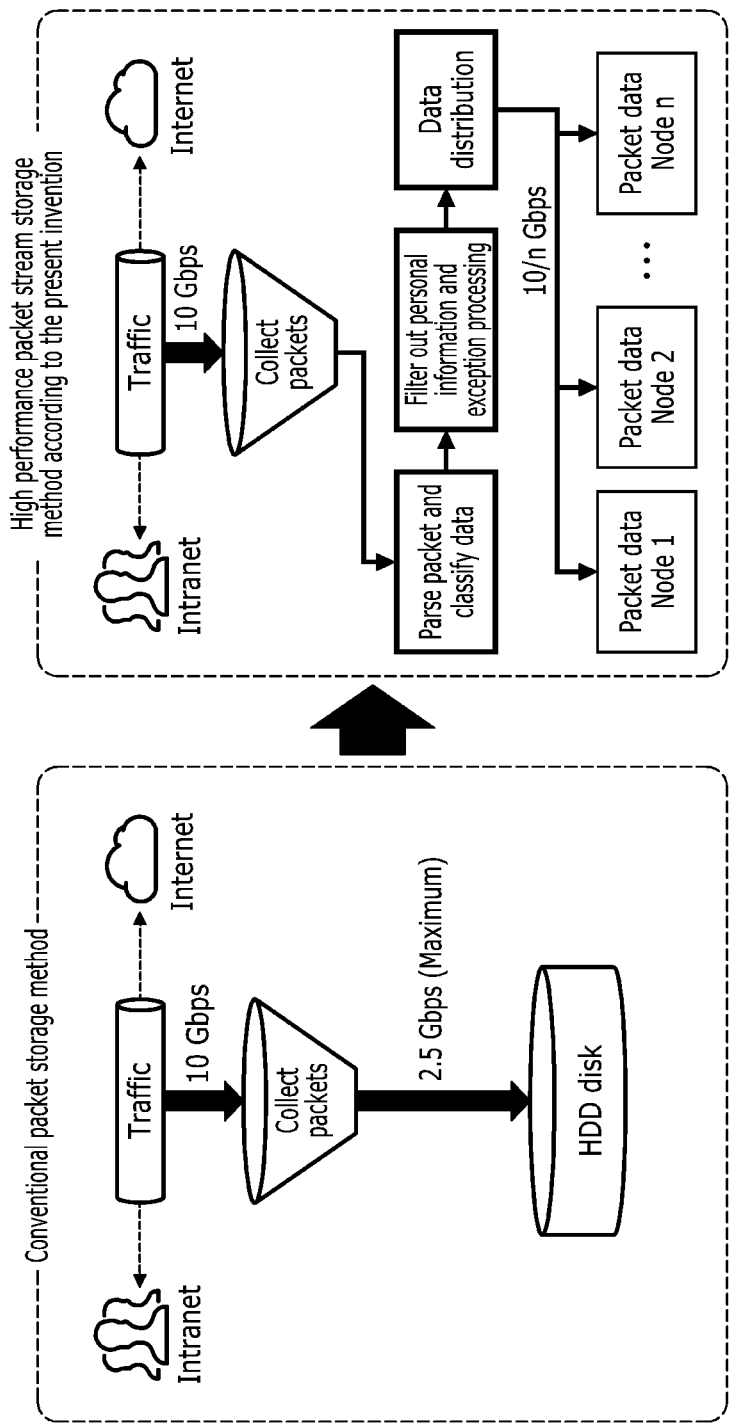
FIG. 2 is a diagram schematically illustrating a high performance packet stream storage method according to an embodiment of the present disclosure compared to a conventional packet stream storage method.

FIG. 2 is a diagram schematically illustrating a high performance packet stream storage method according to an embodiment of the present disclosure compared to a conventional packet stream storage method.

A conventional packet storage method is a technology for simply collecting packets in real time and directly storing them in a local disk, and must have fast I/O performance in order to store a large amount of ultra-high speed traffic, such as 10 Gbps, and must use a high-speed storage. For this reason, there is a problem in that a product cost for a security system increases.

In order to solve such a problem, a high performance packet stream storage system and a high performance packet stream storage method using same according to embodiments of the present disclosure enable the storage of an ultra-high speed packet and the processing of a large amount of data without a loss of data through distribution and storage processing.

Figure 3:
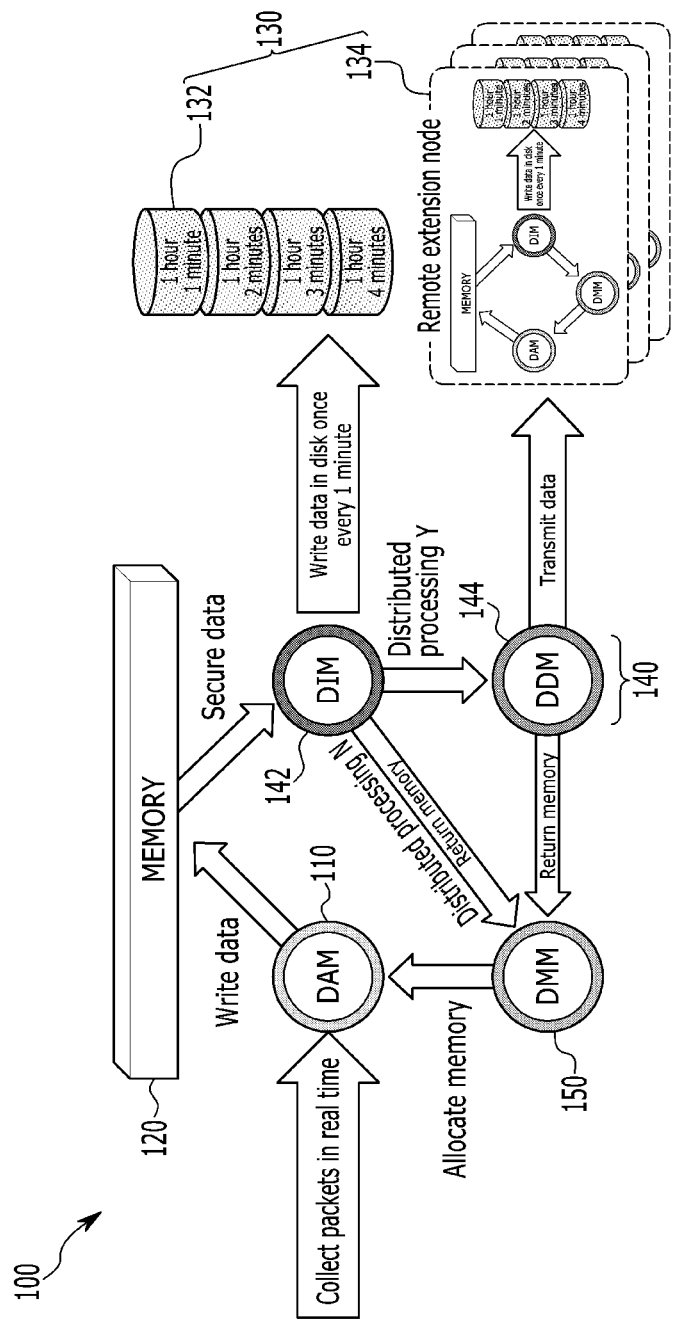
FIG. 3 is a diagram schematically illustrating a high performance packet stream storage system according to an embodiment of the present disclosure.
Figure 4:
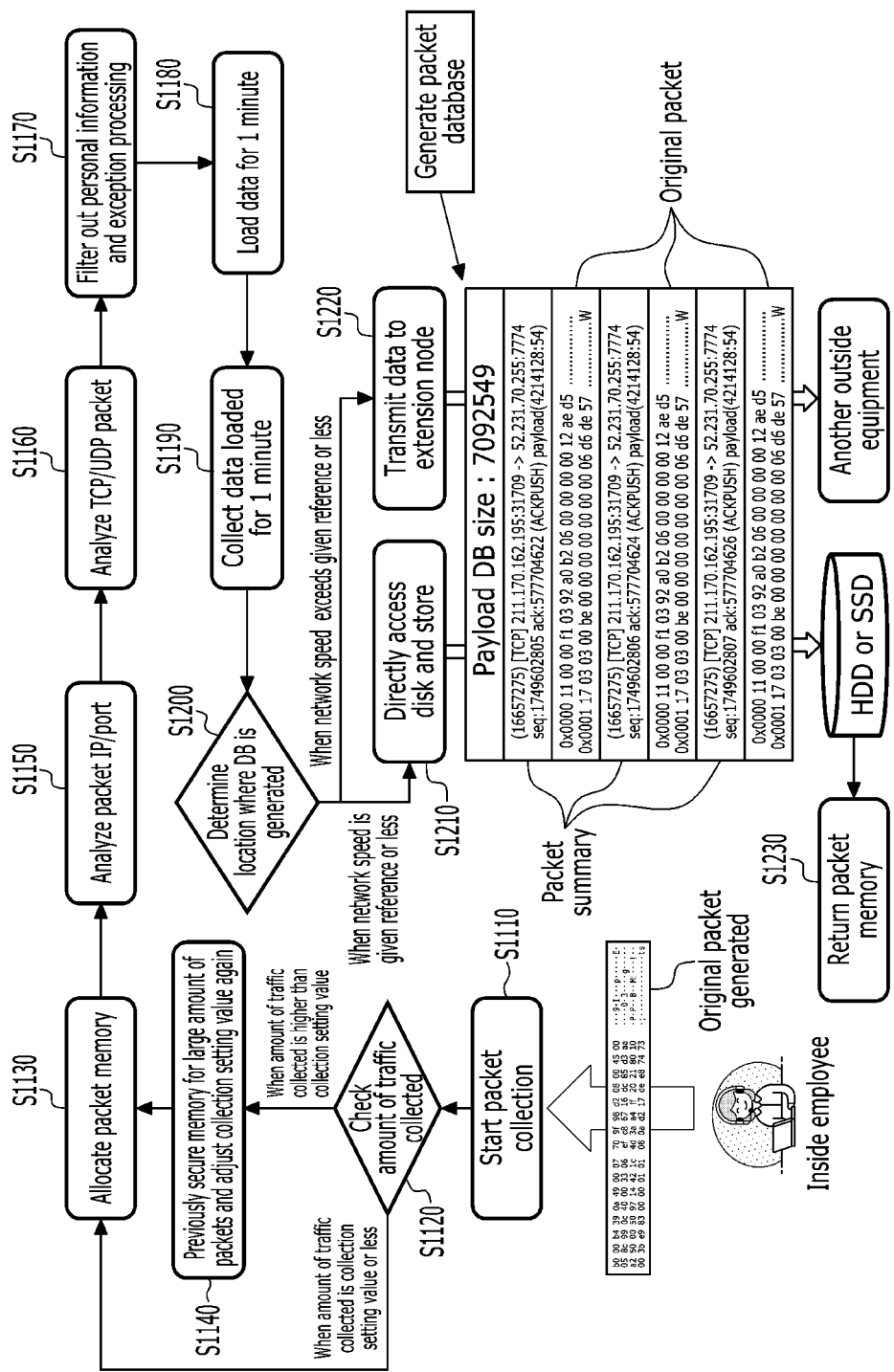
FIG. 4 is a diagram specifically illustrating a high performance packet stream storage method according to an embodiment of the present disclosure.

FIG. 3 is a diagram schematically illustrating a high performance packet stream storage system according to an embodiment of the present disclosure. FIG. 4 is a diagram specifically illustrating a high performance packet stream storage method according to an embodiment of the present disclosure.

A high performance packet stream storage system 100 according to an embodiment of the present disclosure may include a data access module (DAM) 110, a memory unit 120, a storage unit 130, a storage management module 140, and a data memory module (DMM) 150.

The storage unit 130 may include a local disk 132 and/or a plurality of extension nodes 134 at remote places. The storage management module 140 may include a disk interface module (DIM) 142 and/or a data distributed module (DDM) 144.

A network connects intranet and the Internet. A large amount of data may be transmitted at an ultra-high speed over the network. The data access module 110 is a device for collecting and parsing network packet data and writes the data in the memory, and may collect the original packet data from data traffic transmitted over the network in real time (S1110).

The data access module 110 checks whether the amount of collected packets exceeds a collection setting value (S1120). When the amount of collected packets is the collection setting value or less, the data access module 110 may directly write the original packet data, collected in real time, in a secured memory region of the memory unit 120 (S1130).

When the amount of collected packets of the data access module 110 exceeds the collection setting value, the data access module 110 may previously secure an additional memory for an exceeded amount of the original packet data in the memory unit 120, and may adjust the collection setting value again (S1140).

At the same time, the data access module 110 may extract metadata from the collected original packet data, and may write the metadata in a secured memory region of the memory unit 120. The metadata may include a source IP, a source port, a destination IP, a destination port, a protocol, etc.

The data access module 110 may perform packet IP/port analysis (S1150) and perform TCP/UDP packet analysis (S1160), but is not limited thereto. Only any one of packet IP/port analysis and TCP/UDP packet analysis may be performed.

The data access module 110 may exclude the original packet data, corresponding to exception information, from a memory writing target by filtering out the exception information from the extracted metadata (S1170). In this case, the exception information may be personal information, information transmitted by a specific person, information related to a specific IP, etc.

After the collected original packet data and the extracted metadata are written in the memory region of the memory unit 120 for a given writing period (S1180), they may be stored in the storage unit 130 by the storage management module 140. For example, the collected original packet data and the extracted metadata may be written in a memory of the memory unit 120 for 1 minute. The original packet data and metadata written for 1 minute as described above are collected and prepared to be databased and stored in the storage unit 130 for each minute (S1190). The storage management module 140 may put the original packet data and the metadata into a database by storing the original packet data and metadata from the memory unit 120 in the storage unit 130.

The storage management module 140 selects whether to store the original packet data and the metadata in the local disk 132 or to distribute and store the original packet data and the metadata in the extension nodes 134 (S1200).

If a network speed is a given reference or less, the disk interface module 142 may directly store the original packet data and the metadata from the memory unit 120 in the local disk 132 (S1210). The disk interface module 142 can quickly store the original packet data and the metadata in the local disk 142 because it directly accesses the local disk 132 without the intervention of an OS. The original packet data and the metadata are written in the local disk 132 in a given writing period unit (e.g., for each minute).

If the network speed exceeds the given reference, the data distributed module 144 may distribute and store the original packet data and the metadata from the memory unit 120 in the extension nodes 134 (S1220). A distributed and storage method is a method of dividing a large amount of structured data into several parts and distributing, storing and managing the data. A known distributed and storage method may be used.

Through such a configuration, although the speed of a network is an ultra-high speed, all data can be stored without a loss of the data while not increasing hardware performance of a storage unit.

As illustrated in FIG. 4, the original packet data and the metadata may be databased and stored in the storage unit 130. The metadata is summarized information of packet data, and is used for fast information search for data. The original packet data is used as the original data for analyzing whether there is hacking.

The data memory module 150 manages a memory region used for packet storage and analysis. After the original packet data and the metadata from the memory unit 120 are stored in the storage unit 130, the data memory module 150 may return the memory region of the memory unit 120 in which the original packet data and the metadata had been written (S1230).

Figure 5:
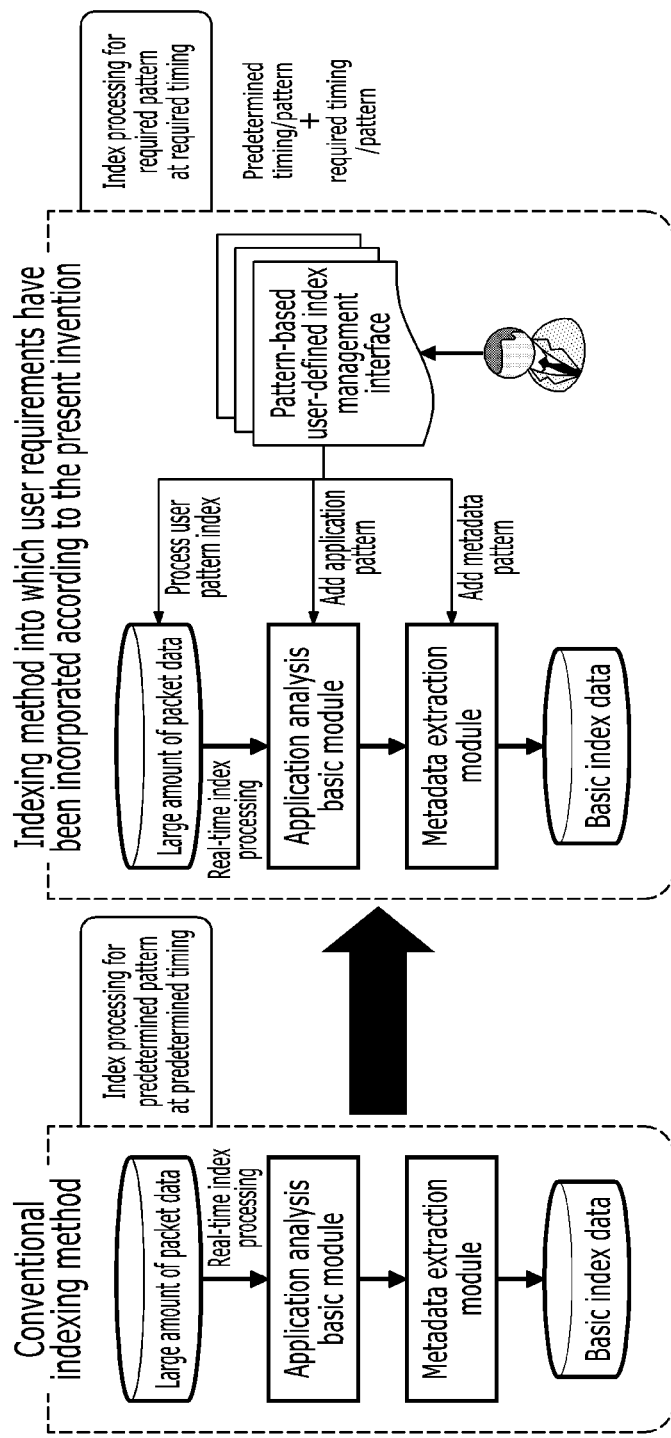
FIG. 5 is a diagram schematically illustrating a pattern-based index processing method according to an embodiment of the present disclosure compared to a conventional pattern-based index processing method.

FIG. 5 is a diagram schematically illustrating a pattern-based index processing method according to an embodiment of the present disclosure compared to a conventional pattern-based index processing method.

A conventional indexing method is a method of indexing and processing a large amount of packet data in a predetermined pattern at predetermined timing. That is, an application analysis basic module analyzes a large amount of packet data, and a metadata extraction module extracts metadata based on the analyzed data.

In contrast, a pattern-based index processing method according to an embodiment of the present disclosure enables user-defined index data to be generated in order to counter various attack scenarios and environments. Index processing may provide a function for enabling a user to designate data at problematic timing and to index the data again in addition to real-time index processing.

That is, in the pattern-based index processing method according to an embodiment of the present disclosure, a pattern-based user-defined index management database may perform user pattern index processing on the original packet data, an application pattern may be added to an application basic module, and a metadata pattern may be added to a metadata extraction module. The pattern-based index processing method according to an embodiment of the present disclosure can perform index processing on a required pattern at required timing in addition to a conventional method of indexing and processing a predetermined pattern at predetermined timing because the original packet data stored in the storage unit is analyzed.

Figure 6:
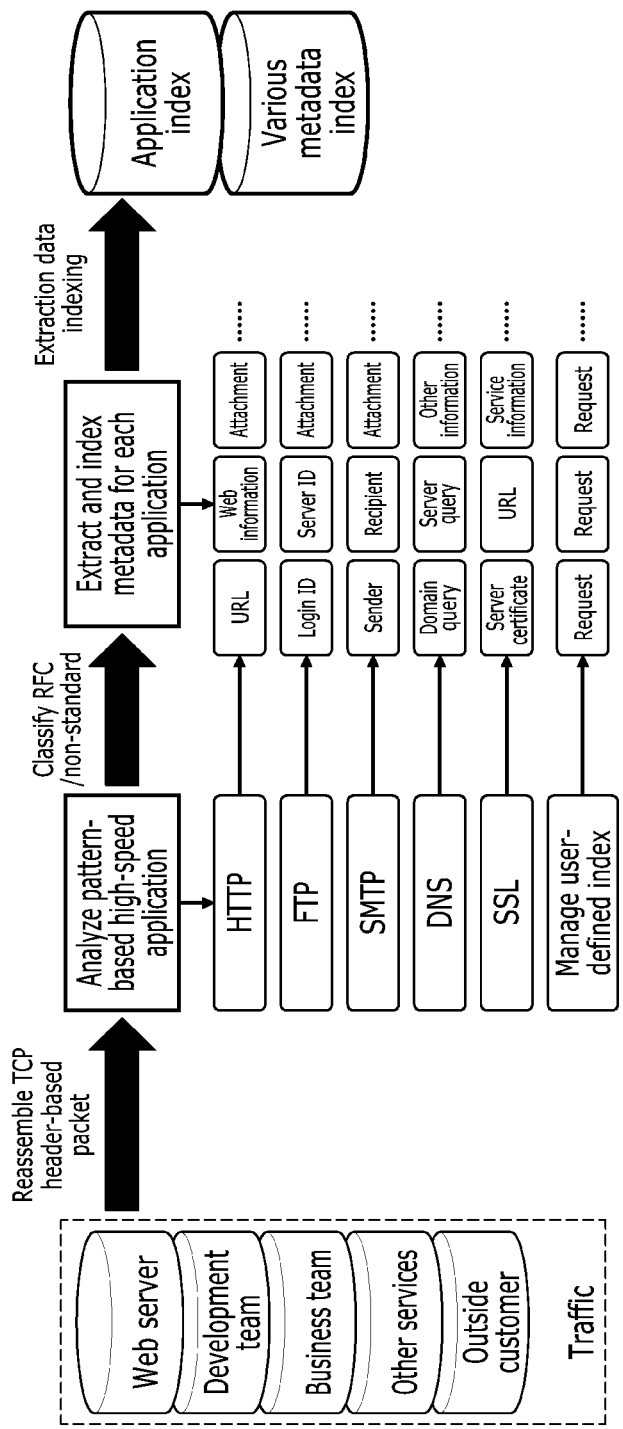
FIG. 6 is a diagram schematically illustrating a pattern-based index processing method according to an embodiment of the present disclosure.
Figure 7:
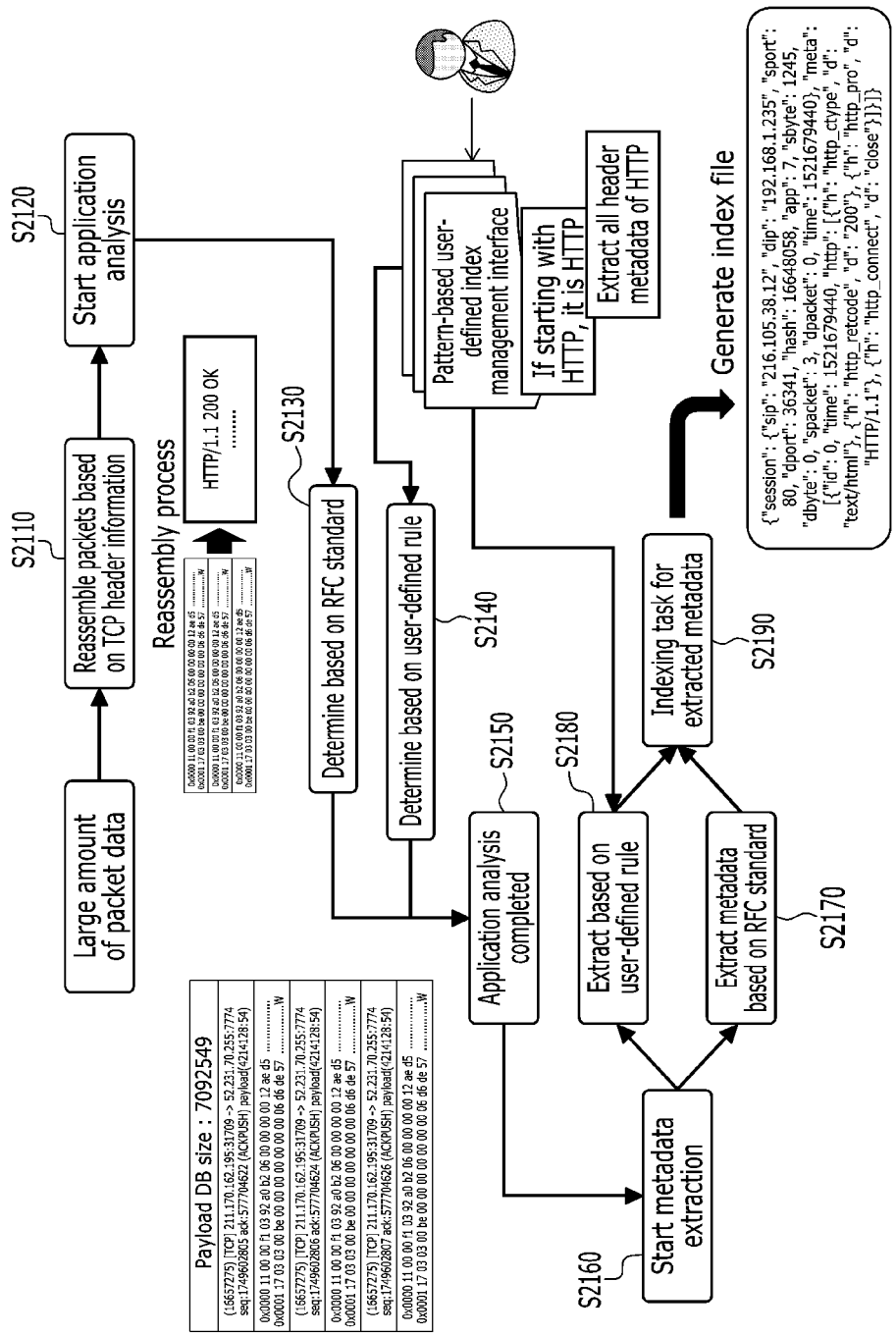
FIG. 7 is a flowchart schematically illustrating a pattern-based index processing method according to an embodiment of the present disclosure.

FIG. 6 is a diagram schematically illustrating a pattern-based index processing method according to an embodiment of the present disclosure. FIG. 7 is a flowchart schematically illustrating a pattern-based index processing method according to an embodiment of the present disclosure.

In a pattern-based index processing method according to an embodiment of the present disclosure, various patterns based on scenarios may be defined, a session-based packet may be classified and redefined based on a pattern, and various hacking attempts may be analyzed.

A pattern-based index processing system according to an embodiment of the present disclosure may include a data reassembly module, an application analysis module and a metadata extraction module.

The original packet data stored in the storage unit 130 in a given writing period unit may be recombined by the reassembly module for an indexing task. The reassembly module recombines the original packet data, stored in the storage unit 130, based on TCP header information of the original packet data stored in the storage unit 130 (S2110).

As described above, the application analysis module starts application analysis based on the reassembled original packet data (S2120). The application analysis module determines that the original packet data is data generated by which type of application.

The application analysis module may determine an application for the reassembled original packet data based on an RFC standard (S2130). In order to determine an application not defined in the RFC standard, a rule defined by a user may be used (S2140).

If an application that has generated the reassembled original packet data is determined using such a method (S2150), the metadata extraction module may extract metadata from the reassembled original packet data (S2160). If the original packet data has been generated by an application defined in the RFC standard, the metadata may be extracted based on the RFC standard (S2170). Metadata may be extracted from the original packet data, generated by an application not defined in the RFC standard, based on a rule defined by a user (S2180).

The user-defined rule used by the application analysis module in order to determine an application and the user-defined rule used by the metadata extraction module in order to extract metadata may be defined by a pattern-based user-defined index management database.

The metadata extraction module finally indexes the metadata extracted as described above by performing an indexing task on the metadata (S2180).

As illustrated in FIG. 6, the metadata may be extracted and indexed for each application. For example, if an application is identified to be an HTTP, the extracted metadata may be indexed as a URL, web information or an attachment. If an application is identified to be an FTP, the extracted metadata may be indexed as a login ID, a server ID or an attachment. If an application is identified to be an SMTP, the extracted metadata may be indexed as a sender, a recipient or an attachment. If an application is identified to be a DNS, the extracted metadata may be indexed as a domain query or a server query. If an application is identified to be an SSL, the extracted metadata may be indexed as a server certificate, a URL or service information. Furthermore, if an application is identified to be an application defined by a user-defined rule, the extracted metadata may be indexed as a form defined based on the application.

The metadata extraction module combines various metadata indices for each application index.

Figure 8:
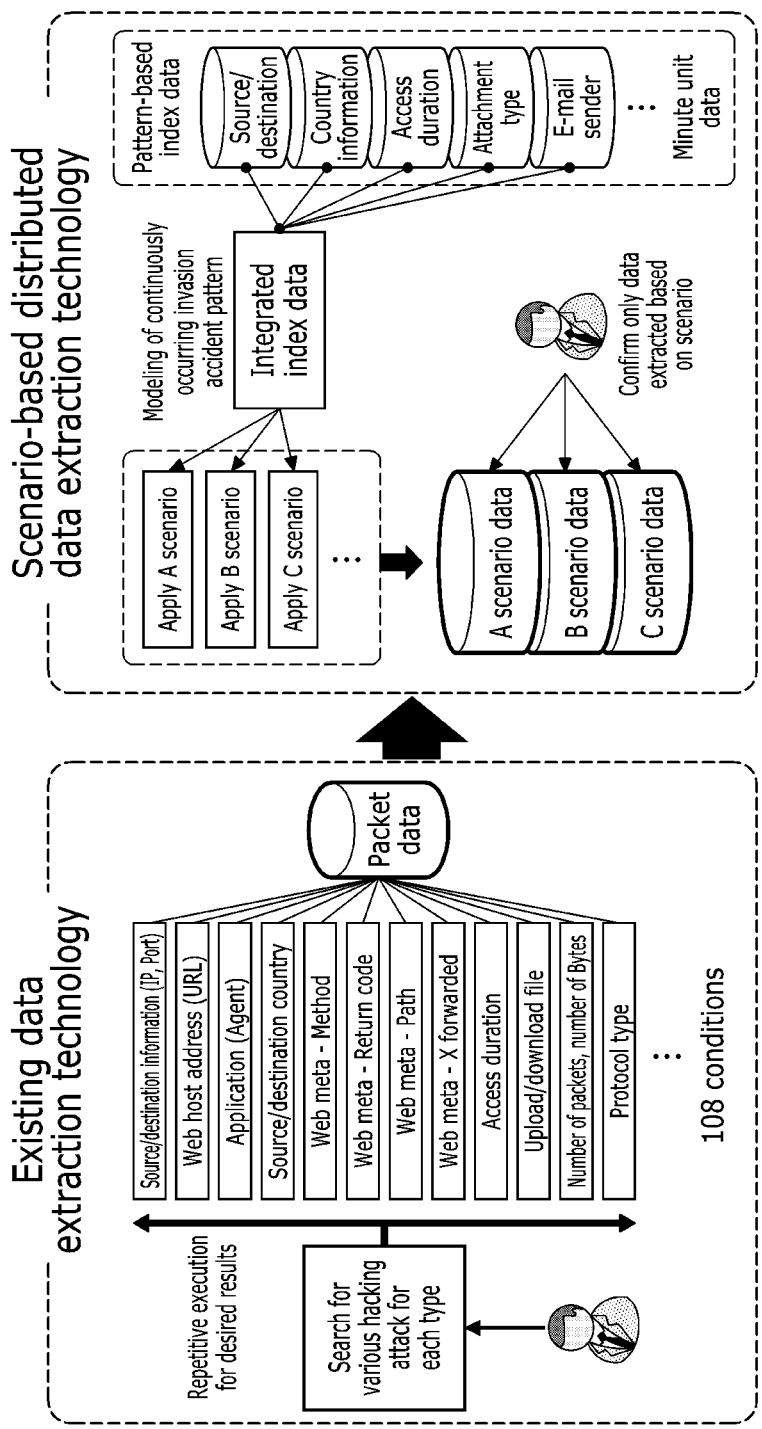
FIG. 8 is a diagram schematically illustrating a scenario-based real-time attack detection method according to an embodiment of the present disclosure compared to a conventional attack detection method.

FIG. 8 is a diagram schematically illustrating a scenario-based real-time attack detection method according to an embodiment of the present disclosure compared to a conventional attack detection method.

Conventionally, data analysis is performed through repetitive search for each situation and condition. For example, a method of repetitively searching for 108 types of conditions, such as source/destination information, a web host address, an application, a source/destination country, web meta—Method, web meta—Return code, web meta—Path, web meta—X forwarded, access duration, an upload/download file, the number of packets, and a protocol type, is used.

However, in the scenario-based real-time attack detection method according to an embodiment of the present disclosure, data for each hacking scenario is classified through an index integration process so that a hacking accident can be rapidly analyzed. That is, a method of generating a plurality of scenarios by performing pattern modeling on a hacking accident pattern that continues to occur by integrating pattern-based index data (e.g., a source/destination, country information, access duration, an attachment type, and an e-mail sender) and confirming only the original packet data that enables a scenario to be established is used.

Figure 9:
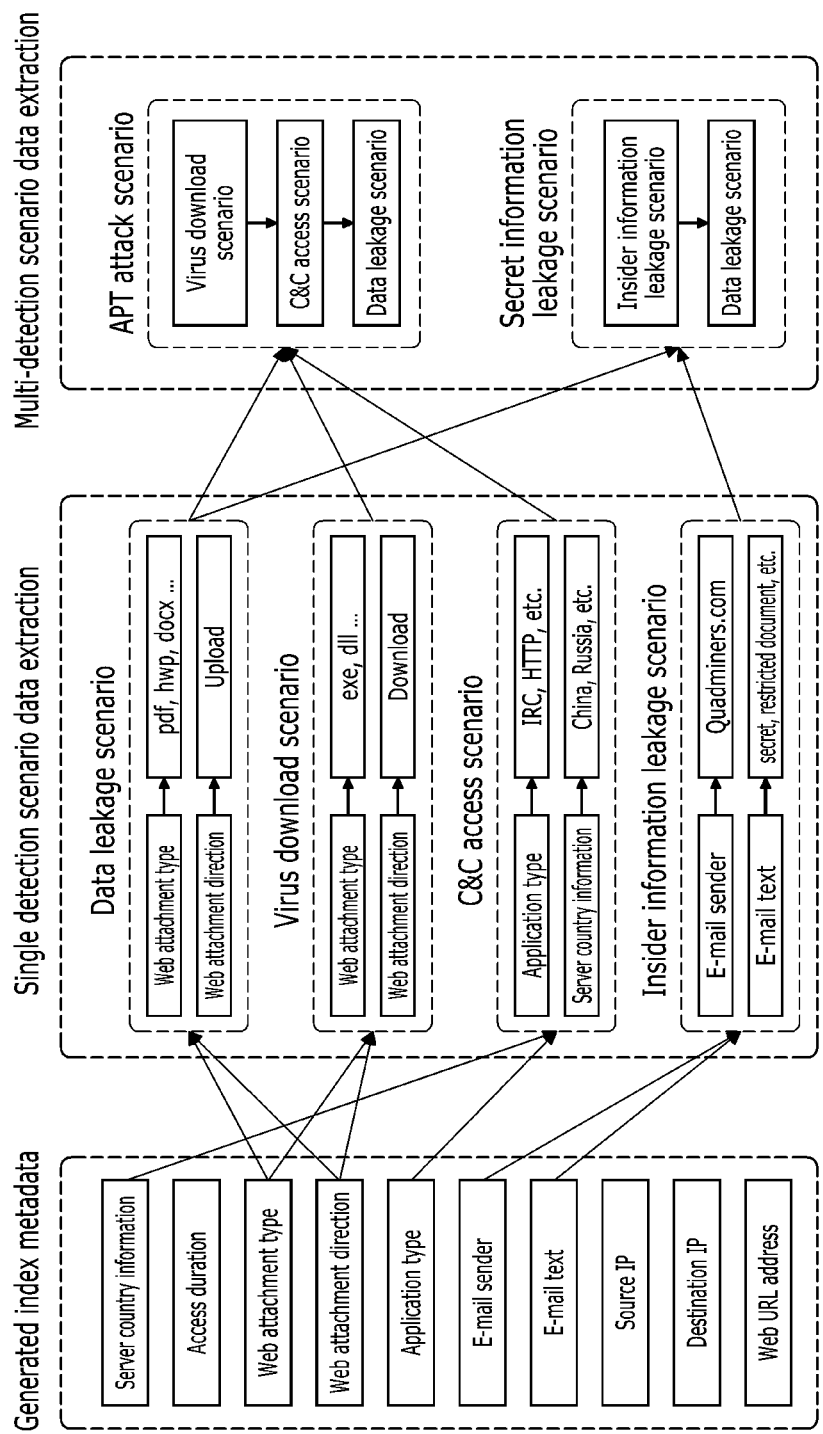
FIG. 9 is a diagram schematically illustrating a scenario-based real-time attack detection method according to an embodiment of the present disclosure.

FIG. 9 is a diagram schematically illustrating a scenario-based real-time attack detection method according to an embodiment of the present disclosure.

In a scenario-based real-time attack detection method using the scenario-based real-time attack detection system according to an embodiment of the present disclosure, first, a scenario generation module may perform the step of forming a scenario to be applied to indexed metadata. A metadata extraction module may perform the step of extracting metadata from the original packet data and indexing the metadata. A metadata detection module may perform the step of detecting indexed metadata corresponding to the scenario.

In this case, the scenario may include a single detection scenario to be applied to the indexed metadata and a multi-detection scenario in which the single detection scenarios have been combined. Furthermore, in the step of extracting, by the metadata extraction module, metadata from the original packet data and indexing the metadata, application analysis and metadata extraction and indexing based on the application analysis have been described above. However, the present disclosure is not limited to a case where metadata must be extracted based on application analysis and indexed. Application analysis may not be performed.

The single detection scenario includes one or more establishment conditions. If all the establishment conditions are satisfied, a scenario for corresponding metadata and packet data corresponding to the corresponding metadata has been established. The establishment condition may include an index type and pattern information. Examples of the index type and pattern information are described later with reference to FIGS. 10 and 11.

As illustrated in FIG. 9, the scenario-based real-time attack detection system may be used to generate a single detection scenario by integrating generated index metadata (e.g., server country information, access duration, a web attachment type, a web attachment direction, an application type, an e-mail sender, e-mail text, a source IP, a destination IP, and a web URL address).

For example, the single detection scenario may include a data leakage scenario, a virus download scenario, a C&C access scenario, and an insider information leakage scenario.

The data leakage scenario may be configured with indices called a web attachment type and a web attachment direction. The web attachment type may define pdf, hwp, docx, etc. The web attachment direction may define upload.

The virus download scenario may be configured with indices called a web attachment type and a web attachment direction. The web attachment type may define exe, dll, etc. The web attachment direction may define download.

The C&C access scenario may be configured with indices called an application type and server country information. The application type may define IRC, HTTP, etc. The server country information may define China, Russia, etc.

The insider information leakage scenario may be configured with indices called an e-mail sender and e-mail text. The e-mail sender may define a specific domain server. The e-mail text may define contents including words called "secret" or "restricted document."

The scenario generation module may generate a multi-detection scenario by combining a plurality of single detection scenarios generated as described above. For example, the multi-detection scenario may include an APT attack scenario, a secret information leakage scenario, etc.

The APT attack scenario may be established when all of the virus download scenario, the C&C access scenario and the data leakage scenario are established. The secret information leakage scenario may be established when both the insider information leakage scenario and the data leakage scenario are established.

Figure 10:
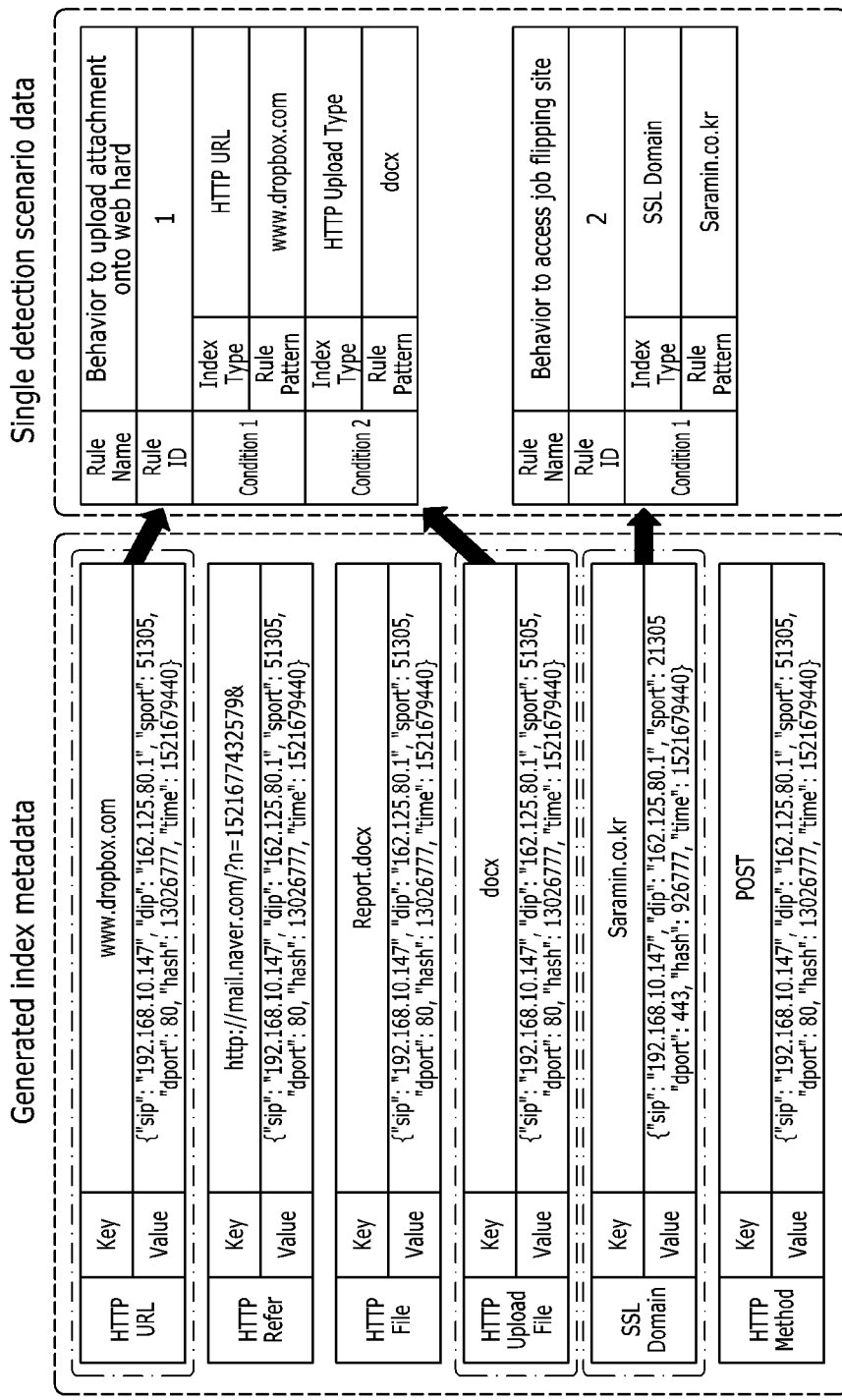
FIG. 10 is a diagram illustrating a step in which a single detection scenario is used in the scenario-based real-time attack detection system according to an embodiment of the present disclosure.
Figure 11:
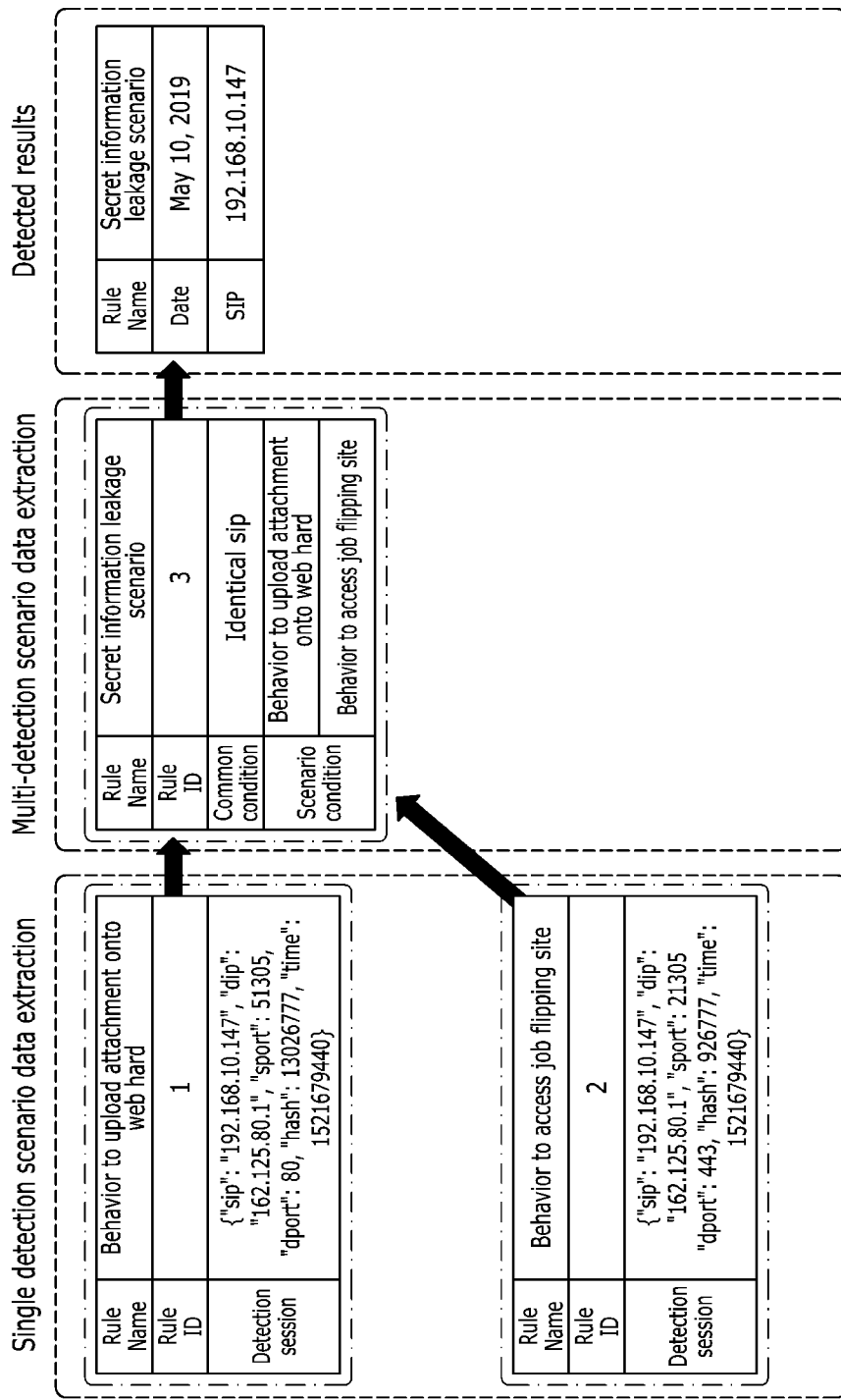
FIG. 11 is a diagram illustrating a step in which multi-detection scenario are used in the scenario-based real-time attack detection system according to an embodiment of the present disclosure.

FIG. 10 is a diagram illustrating a step in which a single detection scenario is used in the scenario-based real-time attack detection system according to an embodiment of the present disclosure. FIG. 11 is a diagram illustrating a step in which multi-detection scenario are used in the scenario-based real-time attack detection system according to an embodiment of the present disclosure.

For example, as illustrated in FIG. 10, a single detection scenario Rule ID No. 1 may have two conditions. In the condition 1, an index type (Index Type) may be set as an HTTP URL, and pattern information (Rule Pattern) may be set as www.dropbox.com. In the condition 2, an index type may be set as an HTTP Upload Type, and pattern information may be set as docx. In such a case, when www.dropbox.com is accessed (condition 1 is satisfied) and a file having a docx extension is uploaded (condition 2 is satisfied), it may be detected that an attachment upload behavior has been performed on a web hard.

Furthermore, a single detection scenario Rule ID No. 2 may have only one condition. In the condition 1, an index type (Index Type) may be set as a secure sockets layer (SSL) domain, and pattern information (Rule Pattern) may be set as saramin.co.kr. In such a case, when saramin.co.kr, that is, a job flipping site, is accessed as an SSL Domain, it may be detected that a behavior of accessing the job flipping site has been performed.

In the multi-detection scenario, when all of two or more detection scenarios are established and the common condition of multi-detection scenario is established, the scenario may be determined to have been established.

For example, as illustrated in FIG. 11, in a multi-detection scenario Rule ID No. 3, the scenario is determined to have been established when detection scenario Rule ID Nos. 1 and 2 are satisfied, and the source IPs (SIPS) of packet data that satisfy the Rule ID Nos. 1 and 2 are the same (192.168.10.147 in FIG. 11), as a common condition. In this case, it may be detected that a secret information leakage behavior has been performed.

Through such a method, various scenarios can be formed, data suspected to be hacking can be found more rapidly and accurately and analyzed, and an attack can be rapidly detected.

The embodiments regarding the functional operation and this subject described in this specification may be implemented in a digital electronic circuit, computer software, firmware or hardware or one or more combinations of them, including the structures disclosed in this specification and structural equivalents thereof.

An embodiment of the subject described in this specification may be implemented as one or more computer program products, that is, one or more modules related to computer program instructions encoded on a program medium of type for execution by a data processor or in order to control a corresponding operation. The program medium of type may be a radio wave type signal or a computer-readable medium. The radio wave type signal is an artificially generated signal, such as an electrical, optical or electromagnetic signal generated, for example, generated by a machine in order to encode information for being transmitted to a proper receiver device for execution by a computer. The computer-readable medium may be a machine-readable storage device, a machine-readable storage substrate, a memory device, a combination of materials that affect a machine-readable radio wave type signal or one or more combinations of them.

The computer program (also known as a program, software, a software application, a script or code) may be written in any form of a programming language, including a compiled or interpreted language or a priori or procedural language, may be deployed in any form, including an independent type program or module, component, subroutine or another unit suitable for being used in a computer environment.

The computer program does not necessarily correspond to a file of a file system. The program may be stored within a single file provided to a requested program, or within multiple interacting files (e.g., a file that stores some of one or more modules, lower programs or codes), or within some (e.g., one or more scripts stored within a markup language document) of a file that retains another program or data.

The computer program may be located in one site or distributed to a plurality of sites, and may be deployed to be executed on multiple computers interconnected over a communication network or one computer.

Additionally, a logical flow and structural block diagram described in this specification describe a corresponding behavior and/or specific method supported by a corresponding function and step supported by disclosed structural means, and may be used to construct a corresponding software structure and algorithm and equivalents thereof.

A process and logical flow described in this specification may be performed by one or more programmable processors that execute one or more computer programs in order to perform a function in such a way as to operate on input data and generate an output.

A processor suitable for executing the computer program includes both microprocessors for a general purpose and special purpose and any one or more processors of any type of digital computer. In general, the processor may receive a command and data from a read only memory or a random access memory or both.

Core elements of a computer include one or more memory devices for storing a command and data and a processor for executing instructions.

Furthermore, in general, the computer may be coupled to operate to receive data one or more mass storage devices for storing data, such as a magnetic disk, a magnetooptic disk or an optical disk, to transmit data to the one or more mass storage devices, or to perform such operations, or may include such operations. However, the computer does not need to have such a device.

The above description proposes the best mode of the present disclosure, and provides an example for describing the present disclosure and for enabling those skilled in the art to fabricate and use the present disclosure. The specification written as described above does not limit the present disclosure to the suggested detailed terms.

Accordingly, although the present disclosure has been described in detail with reference to the above examples, those skilled in the art may apply a modification, a change and transform on the examples without departing from the scope of the present disclosure. For example, in order to achieve effects intended by the present disclosure, all the function blocks illustrated in the drawings do not need to be separately included or all the sequences illustrated in the drawings do not need to be followed according to the illustrated sequence. If not, it is to be understood that all the function blocks or all the sequences may fall within the technical scope of the present disclosure written in the claims.

The invention claimed is:

1. A high performance packet stream storage method of a device in communication with a network, the method comprising:
(a) collecting original packet data from data traffic transmitted over the network, wherein additional memory is secured prior to step (b) for an exceeded amount of collected original packet data when an amount of the collected original packet data exceeds a collection setting value for a memory of the device;
(b) writing the collected original packet data in the memory;
(c) extracting metadata from the collected original packet data and writing the metadata in the memory;
(d) storing, in a storage unit, the collected original packet data and the metadata from the memory without the intervention of an operating system;
(e) excluding exception information from a memory writing target by filtering out the exception information from the collected original packet data;
(f) recombining the collected original packet data with the metadata based on Transport Control Protocol (TCP) header information to form recombined data;
(g) determining an application for the recombined data;
(h) extracting and indexing recombined metadata of the recombined data based on the application determined in step (g) to form indexed metadata;
(i) forming a plurality of hacking attack scenarios to be compared to the indexed metadata; and
(j) detecting an attack scenario from the plurality of hacking attack scenarios, the detection being based on a correspondence between the attack scenario and the indexed metadata;
wherein the metadata extracted from the collected original packet data is based on an application source of the collected original packet data.

2. The high performance packet stream storage method of the high performance packet stream storage method of wherein: the storage unit comprises a local disk, and the step (d) comprises a step of directly storing, in the local disk, the collected original packet data and the metadata from the memory when a network speed is a given reference or less.

3. The high performance packet stream storage method of the high performance packet stream storage method of wherein: the storage unit comprises a plurality of extension nodes, and the step (d) comprises a step of distributing and storing, in the plurality of extension nodes, the collected original packet data and the metadata from the memory when a network speed exceeds a given reference.

4. The high performance packet stream storage method of claim 1, further comprising a step of returning the memory in which the collected original packet data and the metadata have been written after the step (d).

5. The high performance packet stream storage method of the high performance packet stream storage method of wherein the step (c) comprises a step of storing, in the storage unit, the collected original packet data and the extracted metadata from the memory after the collected original packet data and the extracted metadata are written in the memory for a given writing period.

6. A high performance packet stream storage system comprising:
- a storage unit in which original packet data and metadata are stored and databased;
- a memory unit in which the original packet data and the metadata are written by a processor of the high performance packet stream storage system;
- a reassembly module;
- an application analysis module;
- a metadata extraction module;
- a scenario generation module;
- a metadata detection module;
- a programmable medium having machine readable instructions, the machine readable instructions having a data access module, a storage management module, and a data memory module; and
- a processor configured to execute the machine readable instructions of:
- the data access module collecting the original packet data from data traffic transmitted over a network and extracting the metadata from the collected original packet data, wherein additional memory is secured by the memory unit prior to writing by the processor for an exceeded amount of collected original packet data when an amount of the collected original packet data exceeds a collections setting value for the memory unit;
- the storage management module storing, in the storage unit, the collected original packet data and the metadata from the memory unit without the intervention of an operating system and excluding exception information from a memory writing target by filtering out the exception information from the collected original packet data;
- the reassembly module recombining the collected original packet data based on Transport Control Protocol (TCP) header information to form recombined data;
- the application analysis module determining an application for the recombined data;
- the metadata extraction module extracting and indexing recombined metadata of the recombined data based on the application to form indexed metadata, wherein the metadata extracted from the collected original packet data is based on an application source of the collected original packet data;
- the scenario generation module forming a plurality of hacking attack scenarios to be compared to the indexed metadata;
- the metadata detection module detecting an attack scenario from the plurality of hacking attack scenarios, the detection being based on a correspondence between the attack scenario and the indexed metadata; and
- the data memory module returning a memory region of the memory unit in which the collected original packet data and the metadata had been written after the original packet data and the metadata from the memory unit were stored in the storage unit.

7. The high performance packet stream storage system of claim 6, wherein: the storage unit comprises a local disk;
the storage management module comprises a disk interface module; and
when a network speed is a given reference or less, the disk interface module directly stores, in the local disk, the collected original packet data and the metadata from the memory unit.

8. The high performance packet stream storage system of claim 6, wherein: the storage unit comprises a plurality of extension nodes;
the storage management module comprises a data distributed module; and
when a network speed exceeds a given reference, the data distributed module distributes and stores, in the extension nodes, the original packet data and the metadata from the memory unit.

9. A high performance packet stream storage method of a device in communication with a network, the method comprising:
(a) collecting original packet data from data traffic transmitted over a network;
(b) securing an additional amount of memory for an exceeded amount of collected original packet data when an amount of collected original packet data exceeds a collection setting value, prior to writing the collected original packet data in a memory;
(c) writing the collected original packet data in the memory for a time period;
(d) extracting metadata from the collected original packet data and writing the metadata in the memory for the time period;
(e) determining a network speed and comparing the network speed to a reference speed;
(f) storing the original packet data and the metadata written in the memory during the time period in one of a local disk and a plurality of extension nodes based on the comparison of the network speed to the reference speed;
(g) recombining the collected original packet data based on Transport Control Protocol (TCP) header information to form recombined data;
(h) determining an application for the recombined data;
(i) extracting and indexing recombined metadata of the recombined data based on the application determined in step (h) to form indexed metadata;
(j) forming a plurality of hacking attack scenarios to be compared to the indexed metadata;
(k) detecting an attack scenario from the plurality of hacking attack scenarios, the detection being based on a correspondence between the attack scenario and the indexed metadata;
wherein the metadata extracted from the collected original packet data is based on an application source of the collected original packet data.

10. The high performance packet stream storage method of claim 9, further comprising storing the collected original packet data and the metadata written in the memory during the time period in the local disk when the network speed is less than or equal to the reference speed.

11. The high performance packet stream storage method of claim 9, further comprising distributing and storing the collected original packet data and the metadata written in the memory during the time period in the plurality of extension nodes when the network speed is greater than the reference speed.

* * * * *